(12) United States Patent
Hori et al.

(10) Patent No.: US 12,291,097 B2
(45) Date of Patent: May 6, 2025

(54) VEHICLE DISPLAY CONTROL DEVICE, VEHICLE DISPLAY DEVICE, VEHICLE, VEHICLE DISPLAY CONTROL METHOD, AND NON-TRANSITORY COMPUTER-READABLE RECORDING MEDIUM IN WHICH VEHICLE DISPLAY CONTROL PROGRAM IS RECORDED

(71) Applicant: TOYOTA JIDOSHA KABUSHIKI KAISHA, Toyota (JP)

(72) Inventors: Keigo Hori, Toyota (JP); Ryota Hamabe, Nisshin (JP); Takahiro Hirota, Nukata-gun (JP); Yoshinori Murata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 375 days.

(21) Appl. No.: 17/869,588

(22) Filed: Jul. 20, 2022

(65) Prior Publication Data
US 2023/0083318 A1 Mar. 16, 2023

(30) Foreign Application Priority Data
Sep. 16, 2021 (JP) .................... 2021-151587

(51) Int. Cl.
| | |
|---|---|
| *B60K 35/00* | (2024.01) |
| *B60K 35/10* | (2024.01) |
| *B60K 35/21* | (2024.01) |
| *B60K 35/22* | (2024.01) |
| *B60K 35/23* | (2024.01) |
| *B60K 35/28* | (2024.01) |
| *B60K 35/60* | (2024.01) |

(52) U.S. Cl.
CPC .............. *B60K 35/00* (2013.01); *B60K 35/23* (2024.01); *B60K 35/28* (2024.01); *B60K 35/60* (2024.01); *B60K 2360/167* (2024.01); *B60K 2360/172* (2024.01); *B60K 2360/785* (2024.01)

(58) Field of Classification Search
None
See application file for complete search history.

(56) References Cited

U.S. PATENT DOCUMENTS

2016/0090035 A1* 3/2016 Kobayashi ............... B60Q 9/00
340/456

FOREIGN PATENT DOCUMENTS

| JP | 2012-086691 A | 5/2012 |
| JP | 2021-094954 A | 6/2021 |

* cited by examiner

*Primary Examiner* — Aniss Chad
*Assistant Examiner* — Madison R. Inserra
(74) *Attorney, Agent, or Firm* — Oliff PLC

(57) ABSTRACT

A vehicle display control device that is configured to: change, in accordance with a type of shift range that has been selected, display proportions of a first display region for displaying a shift range of a vehicle and a second display region for displaying a vehicle speed of the vehicle; and display the first display region and the second display region on a display.

11 Claims, 12 Drawing Sheets

VEHICLE DISPLAY CONTROL DEVICE, VEHICLE DISPLAY DEVICE, VEHICLE, VEHICLE DISPLAY CONTROL METHOD, AND NON-TRANSITORY COMPUTER-READABLE RECORDING MEDIUM IN WHICH VEHICLE DISPLAY CONTROL PROGRAM IS RECORDED

CROSS-REFERENCE TO RELATED APPLICATION

This application is based on and claims priority under 35 USC 119 from Japanese Patent Application No. 2021-151587 filed on Sep. 16, 2021, the disclosure of which is incorporated by reference herein.

BACKGROUND

Technical Field

The present disclosure relates to a vehicle display control device, a vehicle display device, a vehicle, a vehicle display control method, and a non-transitory computer-readable recording medium in which a vehicle display control program is recorded.

Related Art

Japanese Patent Application Laid-open (JP-A) No. 2021-094954 discloses a vehicle driver-assistance device configured to display shift lever setting position information, that is, shift ranges, on a meter display disposed in front of a driver of a vehicle. In JP-A No. 2021-094954, for a predetermined amount of time after a shift range has been set, the device enlarges the display of the shift range, thus allowing the driver to more easily comprehend the shift range.

However, although the technology disclosed in JP-A No. 2021-094954 allows the driver to more easily comprehend the shift range, information that is necessary on the display differs depending on each driving situation, and it is desired to allow the driver to more easily comprehend information that is most necessary in each driving situation.

SUMMARY

An aspect of the present disclosure is a vehicle display control device, that includes: a memory; and a processor coupled to the memory, the processor being configured to: change, in accordance with a type of shift range that has been selected, display proportions of a first display region for displaying a shift range of a vehicle and a second display region for displaying a vehicle speed of the vehicle; and display the first display region and the second display region on a display.

DETAILED DESCRIPTION

A vehicle 12 in which a vehicle display device 10 pertaining to an embodiment of the disclosure is installed will now be described with reference to the drawings. The directions of "upper" and "lower" and the directions of "right" and "left" in the following description mean upper and lower in the vehicle up and down direction and right and left in the vehicle width direction.

Figure 1:
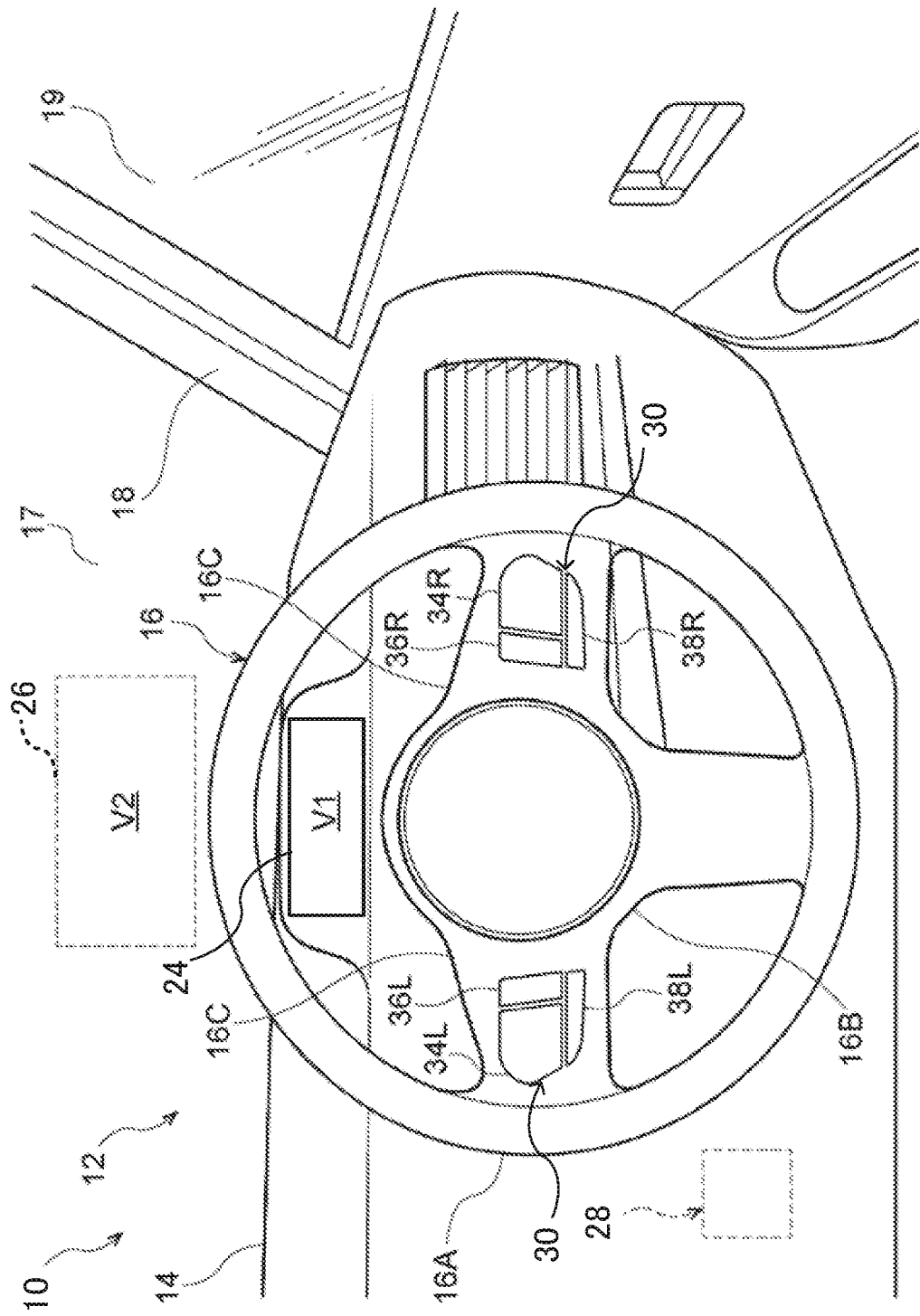
FIG. 1 is a schematic drawing, as viewed from a vehicle rear side, of the front portion of a cabin in a vehicle to which a vehicle display device pertaining to an embodiment has been applied.

As shown in FIG. 1, the front portion of a cabin in the vehicle 12 is provided with an instrument panel 14. The instrument panel 14 extends in the vehicle width direction, and a steering wheel 16 is provided on the vehicle right side of the instrument panel 14. That is, in this embodiment, as an example, the vehicle 12 is a right-hand-drive car where the steering wheel 16 is provided on the right side, and the driver's seat is set on the vehicle right side.

The steering wheel 16 includes a substantially annular rim portion 16A, and on the inner peripheral side of the rim portion 16A is provided a hub portion 16B that configures a central portion of the steering wheel 16. Furthermore, the right side of the rim portion 16A and the hub portion 16B are interconnected by a spoke portion 16C, and the left side of the rim portion 16A and the hub portion 16B are interconnected by a spoke portion 16C. The hub portion 16B is secured to the vehicle rear end of a steering shaft, whereby the steering wheel 16 is rotatably secured to a vehicle body. The vehicle 12 is steered as a result of the steering wheel 16 (the rim portion 16A) being rotatingly operated to rotate the steering shaft.

Furthermore, later-described steering switches 30 are disposed in the spoke portions 16C of the steering wheel 16, and the steering switches 30 are configured to be operable by an occupant. It will be noted that FIG. 1 shows the steering wheel 16 in a state in which the vehicle 12 is traveling forward.

The steering switches 30 include a right first operation switch 34R, a right second operation switch 36R, a right function switching switch 38R, a left first operation switch 34L, a left second operation switch 36L, and a left function switching switch 38L. The right first operation switch 34R, the right second operation switch 36R, and the right function switching switch 38R are provided in the spoke portion 16C on the right side. Furthermore, the left first operation switch 34L, the left second operation switch 36L, and the left function switching switch 38L are provided in the spoke portion 16C on the left side.

The right first operation switch 34R is formed in a substantially rectangular shape and is disposed in the upper right portion of the spoke portion 16C on the right side. Furthermore, the right first operation switch 34R is configured to be capable of input in four directions, up, down, left, and right, and functions are allocated to each of those directions.

Here, in this embodiment, as an example, an electrostatic sensor is installed in the right first operation switch 34R, and functions that have been touched just by the occupant touching the right first operation switch 34R are selected. Furthermore, when the occupant presses the right first operation switch 34R in a state in which a function has been selected, the selected function is executed. Similar electrostatic sensors are also installed in the right second operation switch 36R, the right function switching switch 38R, the left first operation switch 34L, the left second operation switch 36L, and the left function switching switch 38L.

The right second operation switch 36R is formed in a substantially long rectangular shape whose lengthwise direction coincides with the up and down direction, and is disposed on the left side of the right first operation switch 34R. Furthermore, the right second operation switch 36R is configured to be capable of input in two directions, up and down, and functions are allocated to each of those directions.

The right function switching switch 38R is formed in a substantially long rectangular shape whose lengthwise direction coincides with the right and left direction, and is disposed under the right first operation switch 34R and the right second operation switch 36R. Furthermore, the right function switching switch 38R is a switch for switching functions. Specifically, by operating the right function switching switch 38R, the functions allocated to the right first operation switch 34R and the right second operation switch 36R are switched. In this embodiment, as an example, two functions are allocated to each of the operation switches, and the right function switching switch 38R is configured so that every time it is operated, the functions switch.

The left first operation switch 34L is formed in a substantially rectangular shape that is bilaterally symmetrical to the right first operation switch 34R, and is disposed in the upper left portion of the spoke portion 16C on the left side. Furthermore, the left first operation switch 34L is configured to be capable of input in four directions, up, down, left, and right, and functions are allocated to each of those directions.

The left second operation switch 36L is formed in a substantially long rectangular shape that is bilaterally symmetrical to the right second operation switch 36R, and is disposed on the right side of the left first operation switch 34L. Furthermore, the left second operation switch 36L is configured to be capable of input in two directions, up and down, and functions are allocated to each of those directions.

The left function switching switch 38L is formed in a substantially long rectangular shape that is bilaterally symmetrical to the right function switching switch 38R, and is disposed under the left first operation switch 34L and the left second operation switch 36L. Furthermore, the left function switching switch 38L is a switch for switching functions. Specifically, by operating the left function switching switch 38L, the functions allocated to the left first operation switch 34L and the left second operation switch 36L are switched.

Furthermore, on the front end portion of the instrument panel 14, a windshield glass 17 is provided. The windshield glass 17 extends in the vehicle up and down direction and the vehicle width direction and partitions the cabin interior from the cabin exterior.

The vehicle right-side end portion of the windshield glass 17 is secured to a front pillar 18 on the vehicle right side. The front pillar 18 extends in the vehicle up and down direction, and the windshield glass 17 is secured to the vehicle width direction inner end portion of the front pillar 18. Furthermore, the front end portion of a front side glass 19 is secured to the vehicle width direction outer end portion of the front pillar 18. It will be noted that the vehicle left-side end portion of the windshield glass 17 is secured to a front pillar on the vehicle left side.

Here, the instrument panel 14 is provided with a first display unit (a first display) 24 including a display region V1 for images. The display region V1 for images is configured by a meter display provided on the vehicle front side of the driver's seat on the vehicle right side of the instrument panel 14. The first display unit 24 is connected to various types of meter instruments installed in the vehicle 12, and the display region V1 is provided in a position in the field of view of the driver when the driver is looking in the vehicle forward direction.

The windshield glass 17 is provided with a second display unit (a second display) 26 including a display region V2 for images. The display region V2 is set on the vehicle upper side of the display region V1, and the display region V2 is configured by a projection surface projected by a head-up display device 44 (see FIG. 2). Specifically, the head-up display device 44 is provided on the vehicle front side of the instrument panel 14, and is configured so that images are projected from the head-up display device 44 to the display region V2 of the second display unit 26 of the windshield glass 17. That is, the display region V2 is a part of the windshield glass 17 that serves as a projection surface of the head-up display device 44. The first display unit 24 may, for example, be a liquid crystal display, an organic EL display, or a touch panel display, but it is not limited to these.

(Hardware Configurations of Vehicle Display Device 10)

Figure 2:
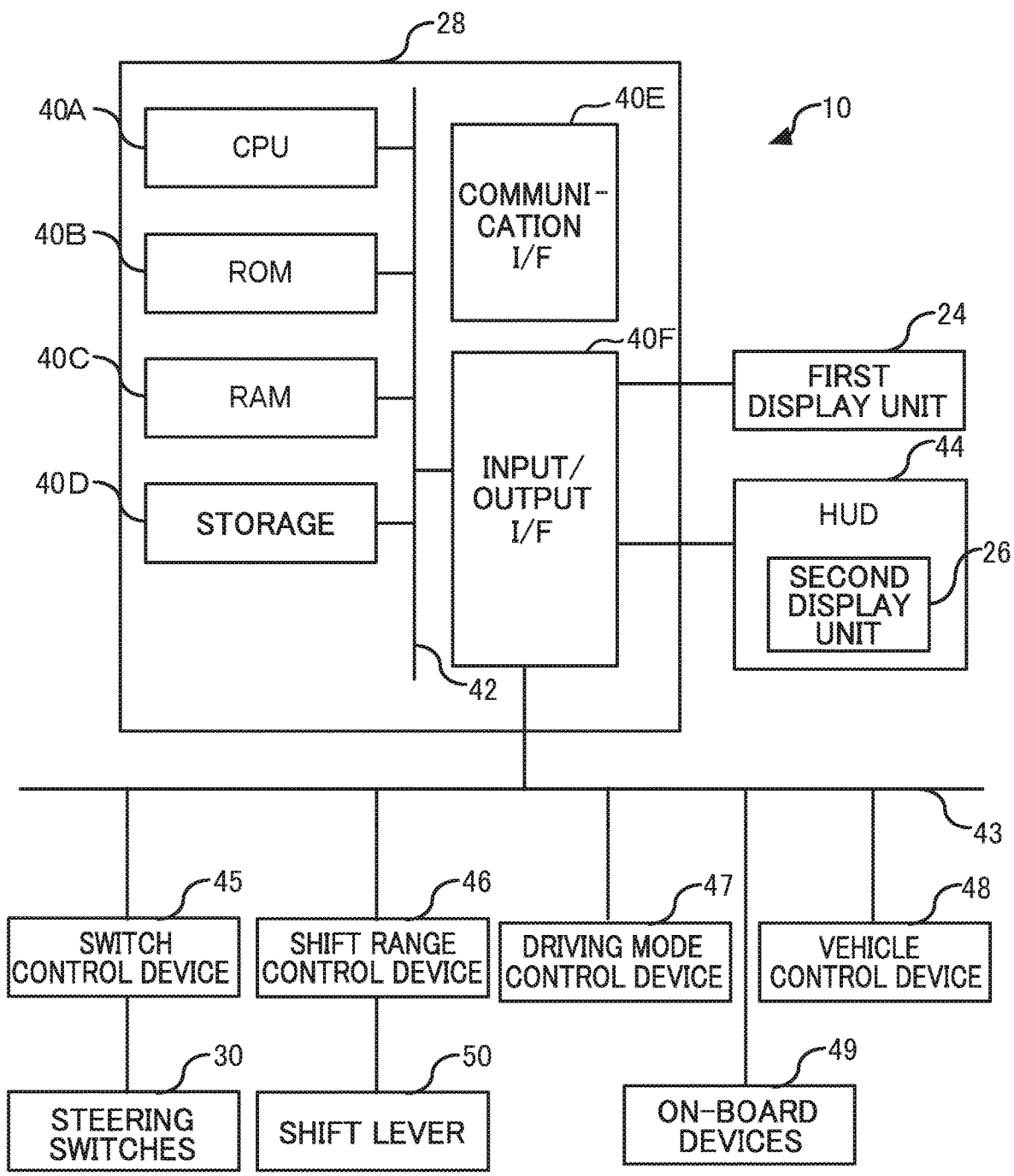
FIG. 2 is a block diagram showing hardware configurations of the vehicle display device pertaining to the embodiment.

The vehicle 12 is provided with a display control electronic control unit (ECU) 28 serving as a vehicle display control device that is a control unit of the vehicle display device 10. FIG. 2 is a block diagram showing hardware configurations of the vehicle display device 10.

As shown in FIG. 2, the display control ECU 28 of the vehicle display device 10 is configured to include a central processing unit (CPU) 40A that is an example of a hardware processor, a read-only memory (ROM) 40B that corresponds to a memory, a random-access memory (RAM) 40C, a storage 40D, a communication interface (communication I/F) 40E, and an input/output interface (input/output I/F) 40F. These configurations are communicably connected to each other via an internal bus 42.

The CPU 40A executes various types of programs and controls each part of the display control ECU 28. That is, the CPU 40A loads programs from the ROM 40B or the storage 40D and executes the programs using the RAM 40C as a workspace. The CPU 40A controls each of the above configurations and performs various types of arithmetic processing in accordance with the programs recorded in the ROM 40B or the storage 40D.

The ROM 40B stores various types of programs and various types of data. The RAM 40C temporarily stores programs or data as a workspace. The storage 40D is configured by a hard disk drive (HDD) or a solid-state drive (SSD) and stores various types of programs, including an operating system, and various types of data. In this embodiment, a program for performing a display process and various types of data are stored in the ROM 40B or the storage 40D.

The communication I/F 40E is an interface for the vehicle display device 10 to communicate with a server and other devices, and uses a standard such as Ethernet (registered trademark), LTE, FDDI, or Wi-Fi (registered trademark), for example.

The input/output I/F 40F has the first display unit 24 and the head-up display device (HUD) 44 connected to it. Images are projected onto the display region V2 of the second display unit 26 by the head-up display device 44.

Furthermore, the input/output I/F 40F is connected to a system bus 43 installed in the vehicle 12. The system bus 43 has a switch control device 45, a shift range control device 46, a driving mode control unit 47, a vehicle control device 48, and on-board devices 49 connected to it.

The switch control device 45 has various types of switches serving as selecting means and setting means, including the steering switches 30, connected to it and controls input from the various types of switches. In this embodiment, the switch control device 45 detects the state of operation of the steering switches 30 and outputs it via the system bus 43 to the display control ECU 28.

The shift range control device 46 has a shift lever 50 of the vehicle 12 connected to it. The shift range control device 46 detects the position to which the shift lever 50 is set, that is, the shift range, and sends a signal representing the detected shift range to the input/output I/F 40F. It will be noted that the shift lever 50 is provided in a position in which it can be operated by a driver sitting in the driver's seat.

It will be noted that in this embodiment, as an example, the shift lever 50 is configured so that it can be switched to a P range (parking position), an R range (reverse position), an N range (neutral position), and a D range (drive position). It will be noted that the shift lever 50 may also be configured so that it can be further switched to an S range (second position) and an L range (low position). Furthermore, when, for example a later-described driving mode is a sport mode, the shift lever 50 is configured so that it can be switched to an M range (manual position).

The driving mode control unit 47 controls driving modes of the vehicle 12. The vehicle 12 has plural driving modes that are preset, and the plural driving modes in this embodiment are, as an example, configured by three driving modes, a normal mode, an Eco mode, and a sport mode. The normal mode is a driving mode that is normally set and allows the vehicle to be driven while delivering good fuel economy and engine performance. The Eco mode is a fuel-efficient driving mode that allows the vehicle to be driven so as to prioritize fuel economy performance over engine performance compared to the normal mode. The sport mode is a high-power driving mode that allows the vehicle to be driven so as to prioritize engine performance over fuel economy performance compared to the normal mode. It will be noted that the driving mode immediately after startup of the vehicle 12 is set to the normal mode. The driving mode control unit 47 sends to the input/output I/F 40F a signal representing the driving mode that has been selected based on a driving mode selection operation performed using the steering switches 30 as an example.

In the vehicle control device 48 are installed various types of control ECUs, such as a vehicle control ECU responsible for vehicle control including driving control, an engine ECU that performs engine control, a steering control ECU that performs steering control, a braking control ECU that performs braking control, and a transmission control ECU that controls the transmission. Furthermore, advanced driver-assistance systems (ADAS) having functions including, as a driving assistance function for maintaining a safe distance from a vehicle ahead, a function for maintaining the vehicle speed and a following distance from the vehicle ahead (an adaptive cruise control (ACC) function) and a function for warning of the danger of a departure from a lane or course and also assisting in some steering wheel operations for avoiding a departure from a lane or course (a lane keeping assist (LKA) function) are installed. The vehicle control device 48 operates in cooperation with each of the control ECUs to perform driving control of the vehicle 12. Furthermore, in the vehicle 12, the ADAS may also operate as driver-assistance devices in cooperation with the vehicle control device 48 to realize driver-assistance functions that assist in driving operations performed by the driver.

The on-board devices 49 are various types of devices installed in the vehicle 12, such as an air conditioner, an audio system, a car navigation system, and an audio input system as well as various types of sensor devices such as cameras, radar, lidar (light detection and ranging, or laser imaging, detection, and ranging), and global positioning system (GPS) sensors.

(Functional Configurations of Display Control ECU 28)

The display control ECU 28 uses the above hardware resources to realize various functions. Functional configurations realized by the display control unit ECU 28 will now be described with reference to FIG. 3.

Figure 3:
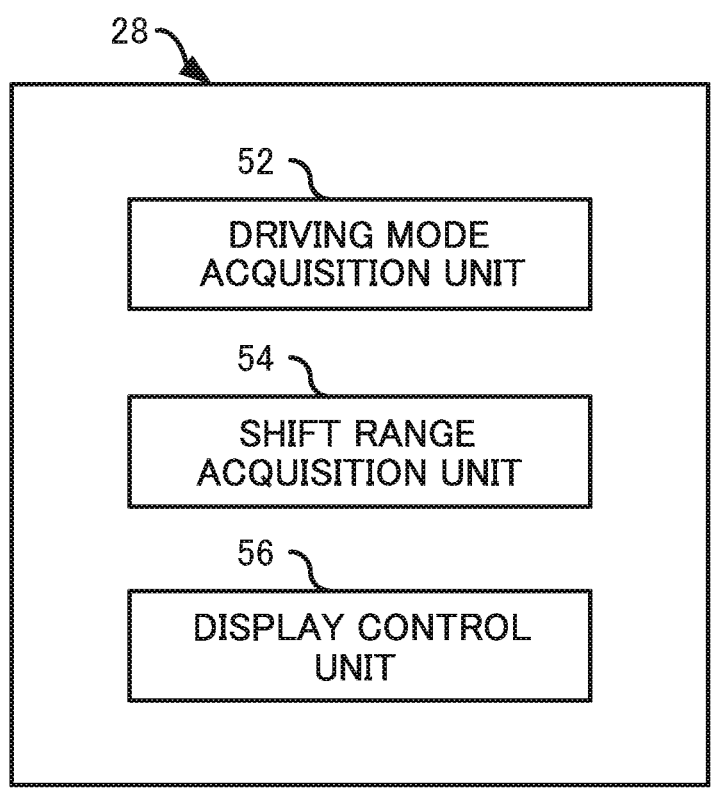
FIG. 3 is a block diagram showing functional configurations of a vehicle display control device pertaining to the embodiment.

As shown in FIG. 3. the display control ECU 28 is configured to include, as functional configurations, a driving mode acquisition unit 52, a shift range acquisition unit 54, and a display control unit 56. It will be noted that these functional configurations are realized as a result of the CPU 40A reading programs stored in the ROM 40B or the storage 40D and executing them.

The driving mode acquisition unit 52 acquires the current driving mode of the vehicle 12. The driving mode acquisition unit 52 of this embodiment, as an example, acquires the currently set driving mode by acquiring via the input/output I/F 40F the signal representing the driving mode sent by the driving mode control unit 47.

The shift range acquisition unit 54 acquires the current shift range (shift position) of the vehicle 12. The shift range acquisition unit 54 of this embodiment, as an example, acquires the currently set shift range by acquiring via the input/output I/F 40F the signal representing the shift range sent by the shift range control device 46.

The display control unit 56 acquires information according to the driving state and operating state of the vehicle 12 via the system bus 43, displays images according to the acquired information as display screens in the display region V1 of the first display unit 24 and also via the HUD 44 in the display region V2 of the second display unit 26. In the display control ECU 28, in a steady state of the vehicle 12 the information displayed in the display region V1 of the first display unit 24 and the image format for displaying that information are fixed.

Figure 4:
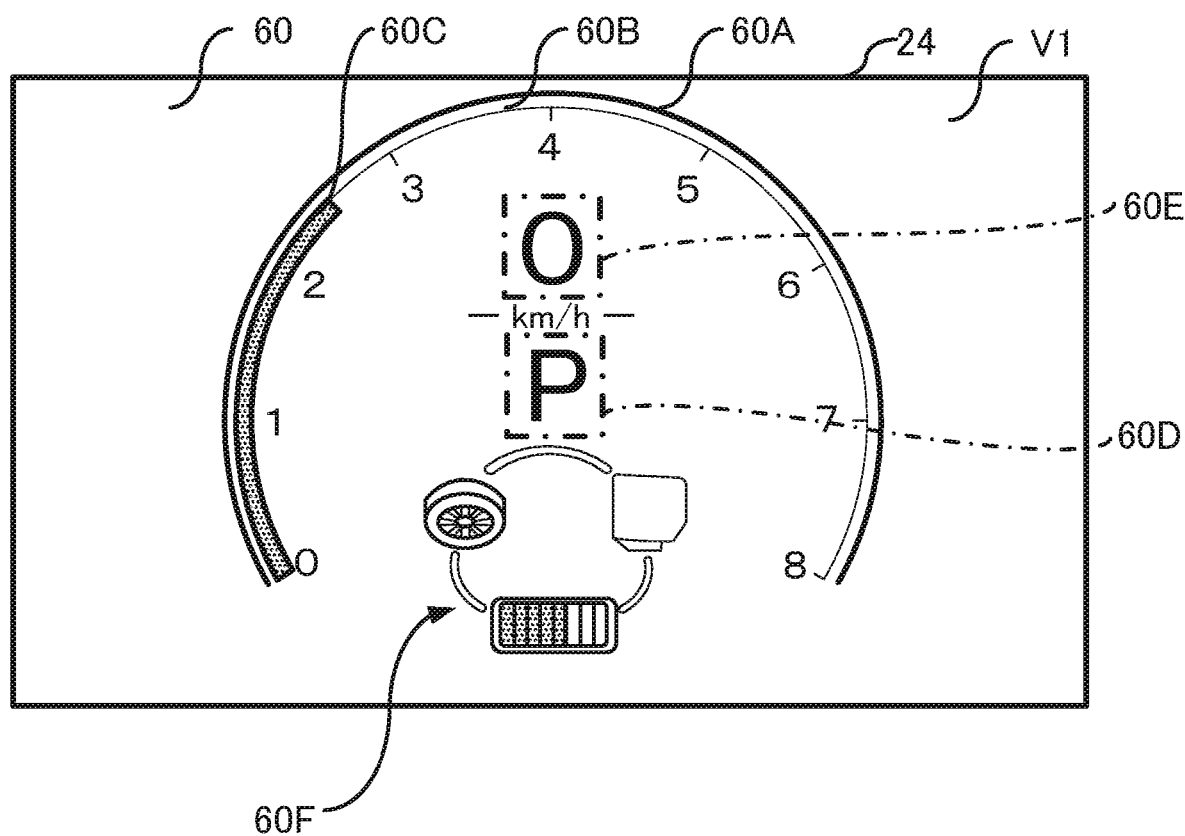
FIG. 4 is a drawing showing an example of what is displayed on a display in a normal mode in the embodiment.

As shown in FIG. 4, an image 60 serving as a display screen displayed in the display region V1 of the first display unit 24 is substantially rectangular. The image 60 is an image showing the engine speed, and in the central portion thereof a tachometer image 60A for showing the engine speed is disposed. In the tachometer image 60A, narrow scale bars 60B in the configuration of an arc are arranged in the circumferential direction. A colored numerical value bar 60C indicating the current engine speed is disposed along the scale bars 60B, and the engine speed is displayed as a result of the right-side end of the numerical value bar 60C extending in accordance with the engine speed, with the left-side end of the numerical value bar 60C in the circumferential direction marking 0 rpm.

Furthermore, in the image 60, the center portion is configured as a shift display region 60D serving as a first display region. In the shift display region 60D, the shift position of the transmission is displayed, and when the shift position of the transmission is changed, the display is changed. Moreover, in the image 60, the upper side of the shift display region 60D is configured as a vehicle speed display region 60E serving as a second display region. In the vehicle speed display region 60E is displayed a numerical value according to the vehicle speed of the vehicle 12. In this embodiment, as an example, the shift display region 60D and the vehicle speed display region 60E are rectangular regions indicated by long-dashed short-dashed lines in the drawings.

Furthermore, in the image 60, a rectangular display region 60F is disposed under the shift display region 60D. The display region 60F is set in a part of the display region V1 of the first display unit 24. When the display control unit 56 receives from the vehicle control device 48 and/or the on-board devices 49 of the vehicle 12 information or an information image relating to a matter that should be reported, it selects, from plural display screens, a display screen for display in the display region 60F based on the received information and displays the display screen in the display region 60F. It will be noted that the plural display screens are stored in the storage 40D, for example, as image data representing each of the display screens.

The plural display screens include, as an example, driving information for providing traffic information and road information received via the communication I/F 40E, driving information for providing information about the fuel economy of the vehicle 12, an energy monitor for providing information about tire, battery, and energy relations, and an audio status screen for providing the operating status of audio. The display control unit 56 switches between and displays these display screens in the display region 60F. It will be noted that the display control unit 56 can also, as an example, switch between and display the plural display screens based on operations using the steering switches 30. It will be noted that in FIG. 4 the energy monitor is displayed in the display region 60F.

Figure 5:
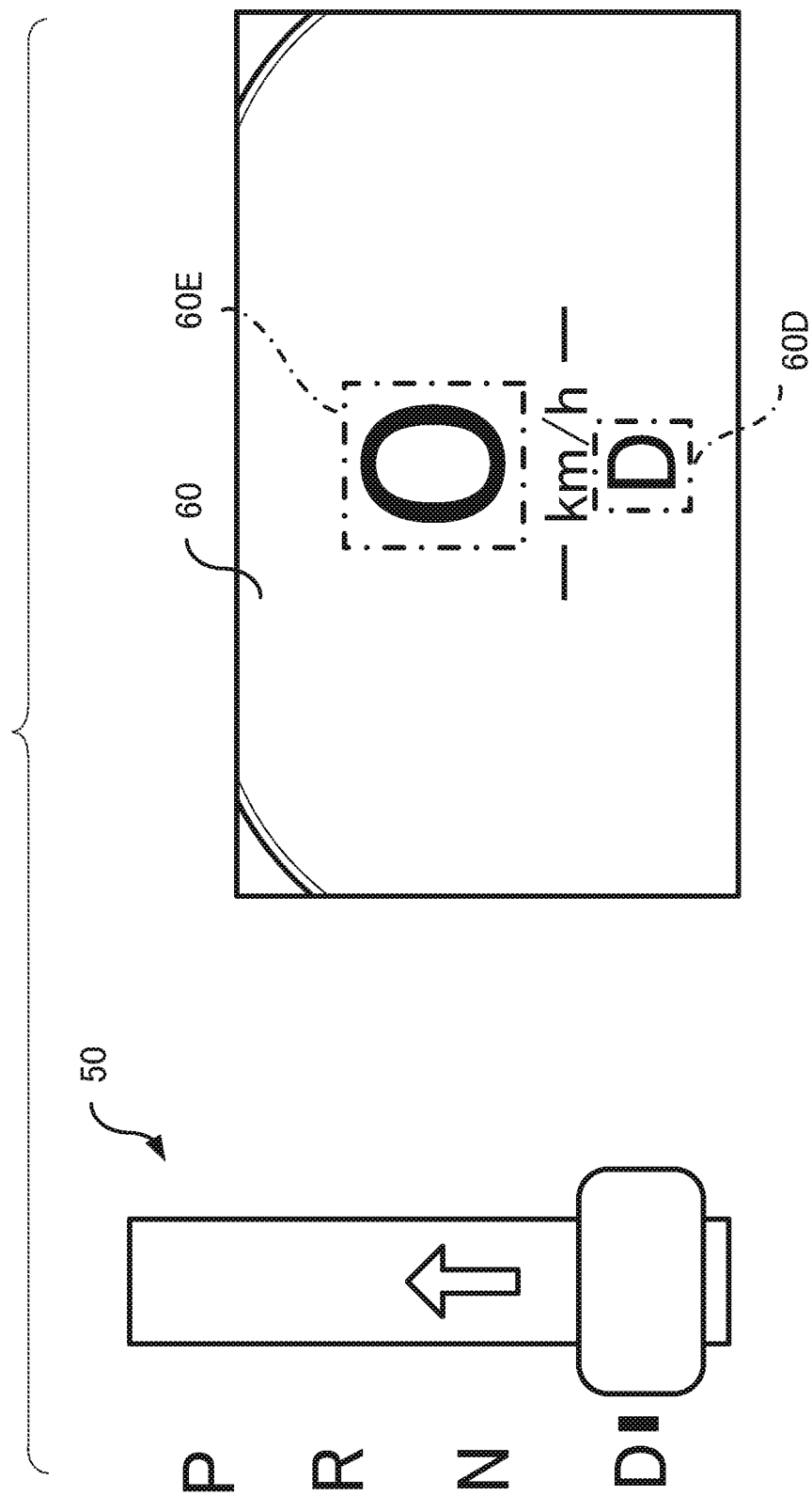
FIG. 5 is an enlarged drawing showing an example of the display when a shift range is a D range.

In this embodiment the display control unit 56 changes, in accordance with the type of shift range that has been selected, the display proportions of the shift display region 60D and the vehicle speed display region 60E and displays the shift display region 60D and the vehicle speed display region 60E. Specifically, as shown in FIG. 5, in a case where the shift lever 50 is set to the D range, that is, in a case where the shift range acquisition unit 54 has acquired the D range, the display control unit 56 displays the vehicle speed display region 60E larger than the shift display region 60D because it is often the case that the vehicle speed is the information that is more necessary for the user than the shift range because its display content changes.

Figure 6:
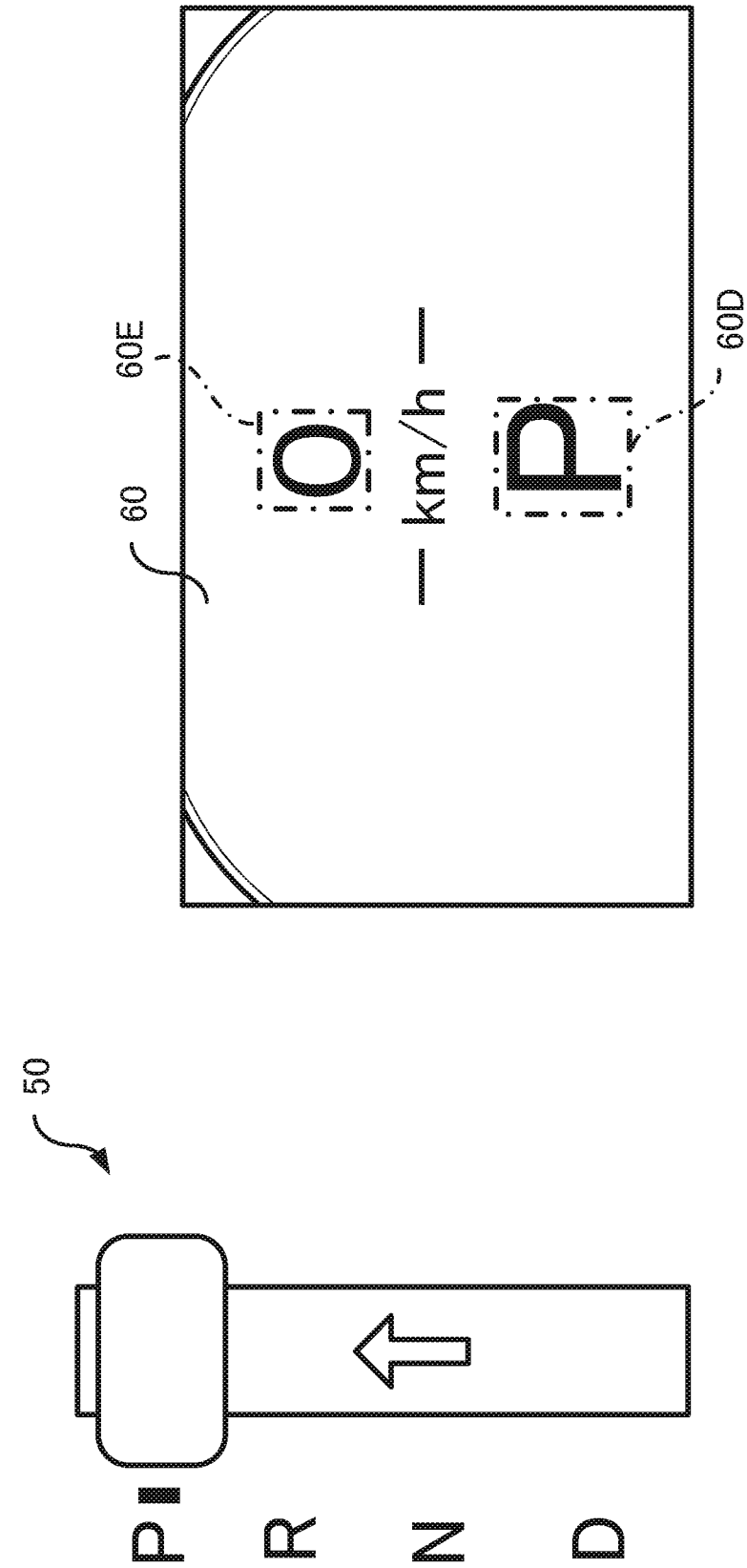
FIG. 6 is an enlarged drawing showing an example of the display when the shift range is a P range.

Furthermore, as shown in FIG. 6, in a case where the shift lever 50 is set to the P range, that is, in a case where the shift range acquisition unit 54 has acquired the P range, the display control unit 56 displays the shift display region 60D larger than the vehicle speed display region 60E because it is often the case that the shift range is the information that is more necessary for the user because the value of the vehicle speed does not change. Similarly, also in a case where the shift lever 50 is set to the N range and the R range, the display control unit 56 displays the shift display region 60D larger than the vehicle speed display region 60E because it is often the case that the shift range is the information that is more necessary to the user because the value of the vehicle speed does not change.

Specifically, images representing content displayed in the shift display region 60D and the vehicle speed display region 60E are stored beforehand in the storage 40D, as an example, by different sizes. The display control unit 56 acquires the corresponding images from the storage 40D in accordance with the type of shift range acquired by the shift range acquisition unit 54 and displays the display content represented by the acquired images in the shift display region 60D and the vehicle speed display region 60E.

It will be noted that in this embodiment, for example, when the shift range displayed in the shift display region 60D is changed, the display control unit 56 can display with an animated display that inverts the images displayed in the shift display region 60D. Similarly, when the value displayed in the vehicle speed display region 60E is changed, the display control unit 56 can display with an animated display that inverts the images displayed in the vehicle speed display region 60E.

Furthermore, the display control unit 56 also changes the layout including the display proportions of the shift display region 60D and the vehicle speed display region 60E in accordance with the driving mode acquiring by the driving mode acquisition unit 52. Specifically, in a case where the driving mode acquisition unit 52 has acquired the normal mode and the Eco mode, as shown in FIG. 4, the display control unit 56 displays, in the tachometer image 60A for displaying the engine speed, a normal mode image with a layout in which the narrow scale bars 60B in the configuration of an arc are arrayed. It will be noted that in a case where the driving mode acquisition unit 52 has acquired the Eco mode, the display control unit 56 displays, in the display region 60F, the driving information for providing information about the fuel economy of the vehicle 12.

Figure 7:
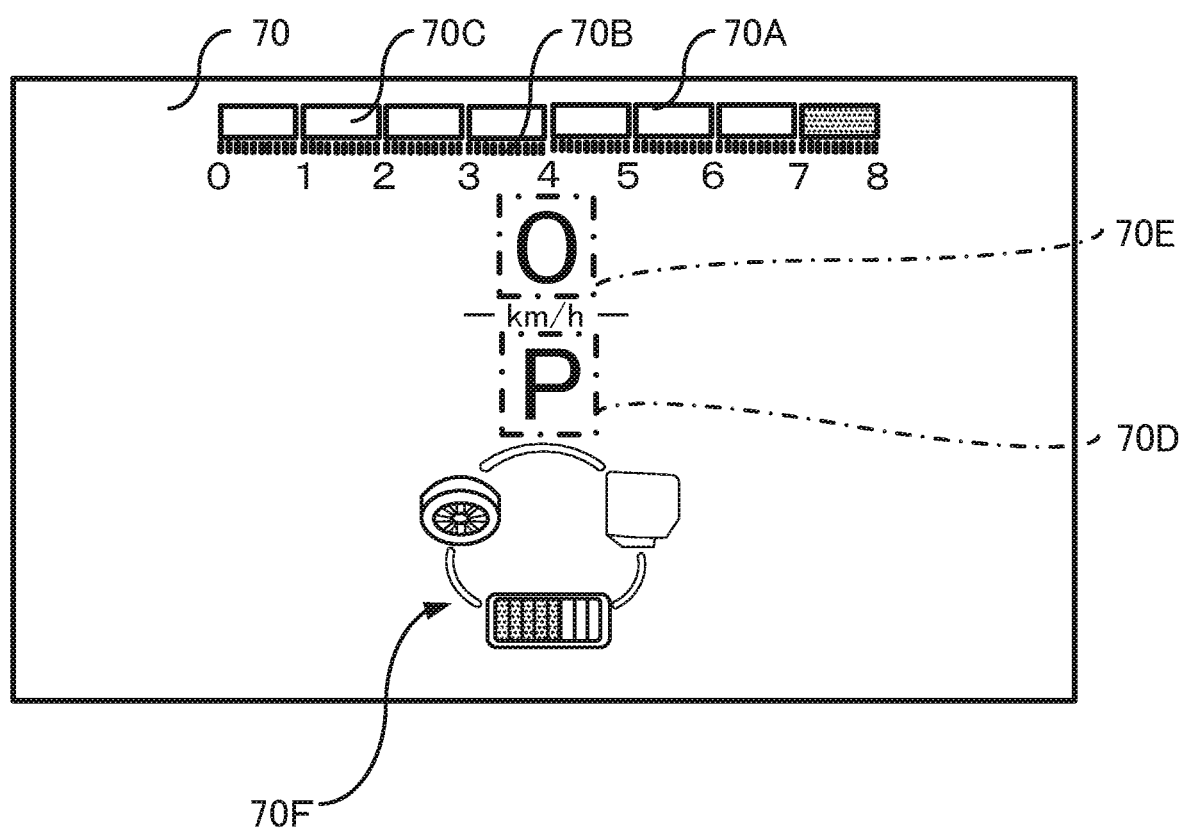
FIG. 7 is a drawing showing an example of what is displayed on the display in a sport mode in the embodiment.

Furthermore, in a case where the driving mode acquisition unit 52 has acquired the sport mode, the display control unit 56 displays a display screen represented by an image 70 in the display region V1 of the first display unit 24. In the image 70, as shown in FIG. 7 as an example, a tachometer image 70A for showing the engine speed is disposed. In the tachometer image 70A, narrow scale bars 70B in the configuration of a straight line are arranged in the horizontal direction. Numerical value bars 70C that indicate the current engine speed and are divided into a plurality are disposed along the scale bars 70B, and the engine speed is displayed by changing the color of the divided numerical value bars 70C in accordance with the engine speed, with the left-side end marking 0 rpm (see FIG. 8).

Furthermore, in the image 70, the center portion is configured as a shift display region 70D serving as a first display region, and the upper side of the shift display region 70D is configured as a vehicle speed display region 70E serving as a second display region. In this embodiment, the shift display region 70D and the vehicle speed display region 70E are rectangular regions indicated by long-dashed short-dashed lines in the drawings. Furthermore, in the image 70 also, a rectangular display region 70F is disposed under the shift display region 70D. The display region 70F has the same function as that of the display region 60F.

As described above, the display control unit 56 changes, in accordance with the driving mode, the layout of the display region V1 as shown in the image 60 or the image 70. No matter which of the image 60 and the image 70 is displayed, the display control unit 56 changes, in accordance with the type of shift range that has been selected, the display proportions of the shift display region 60, 70D and the vehicle speed display region 60E, 70E and displays the shift display region 60, 70D and the vehicle speed display region 60E, 70E as described above.

Figure 8:
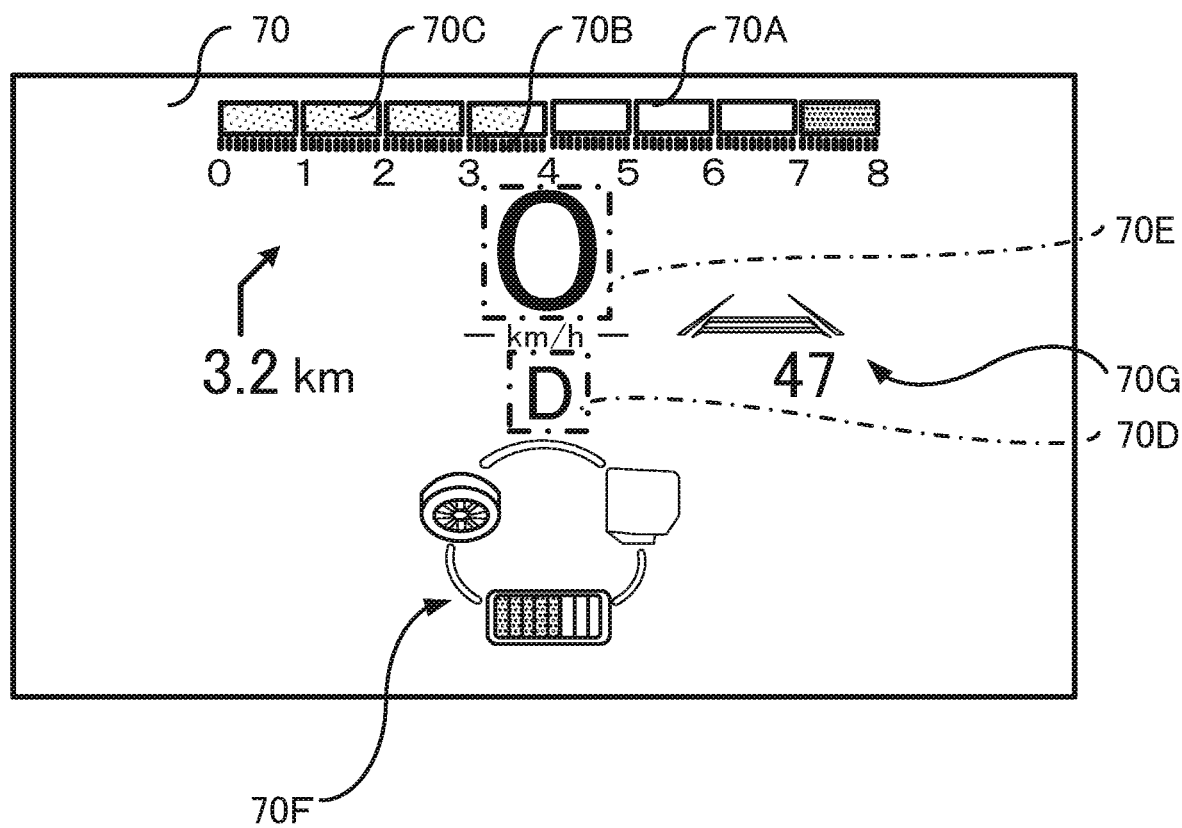
FIG. 8 is a drawing showing an example of the display when the shift range is the D range in the sport mode.

Furthermore, in a case where the driving mode acquisition unit 52 has acquired the sport mode and the shift range acquisition unit 54 has acquired the D range, as shown in FIG. 8, the display control unit 56 displays the vehicle speed display region 70E larger than the shift display region 70D because it is often the case that the vehicle speed is the information more necessary to the user than the shift range because its display content changes.

Figure 9:
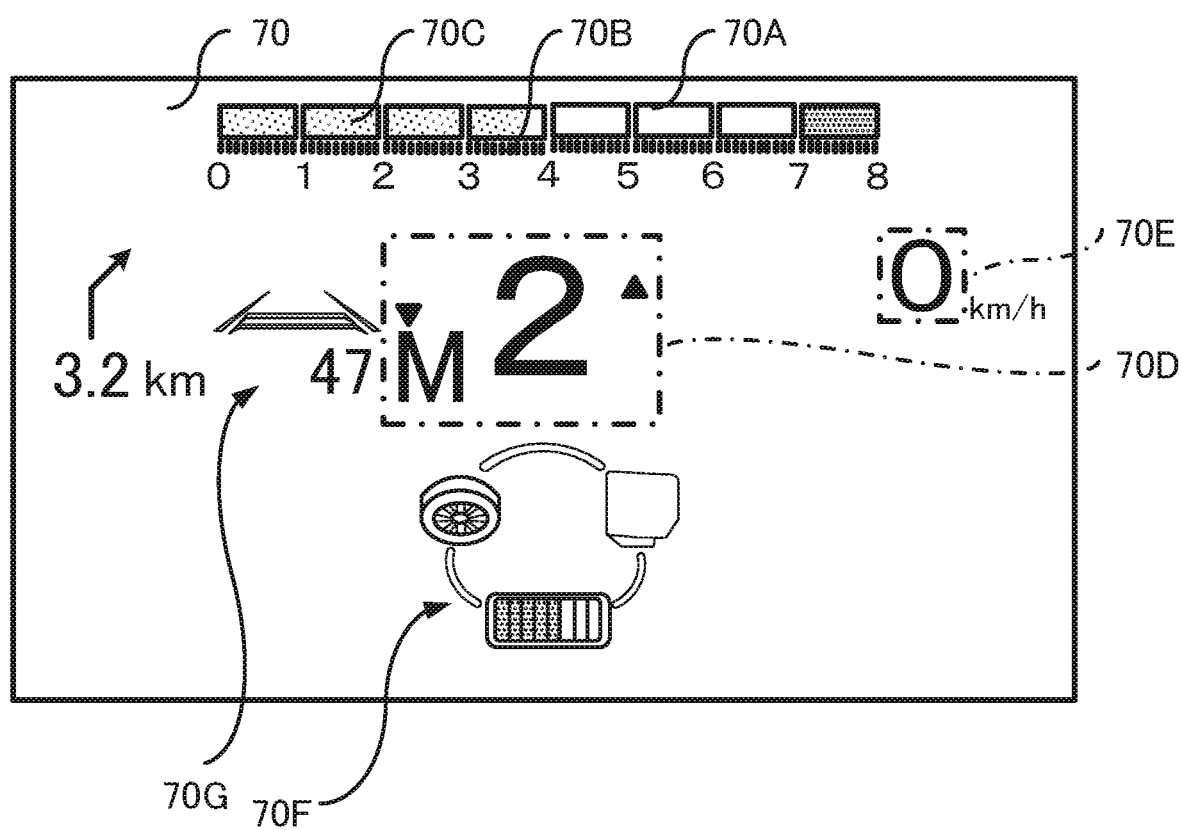
FIG. 9 is a drawing showing an example of the display when the shift range is an M range in the sport mode.

In a case where the driving mode acquisition unit 52 has acquired the sport mode and the shift range acquisition unit 54 has acquired the M range, as shown in FIG. 9, the display control unit 56 displays the vehicle speed display region 70E larger than the shift display region 70D, moves the vehicle speed display region 70E to the right side in the image 70, and displays the shift display region 70D in the central portion in the image 70. It will be noted that in a case where the M range is set, the character "M" indicating the manual mode is displayed together with a number ("2" in FIG. 9) indicating the gear shift position in the shift display region 70D, and this number is displayed larger than the character "M".

It will be noted that in this embodiment, as shown in FIG. 8 and FIG. 9, an image 70G representing the headway from a vehicle ahead (the distance between one vehicle and another vehicle in front of the one vehicle) is displayed. In a case where the D range is set, as shown in FIG. 8 as an example, the image 70G is displayed on the right side of the shift display region 70D. In a case where the M range is set, as shown in FIG. 9 as an example, the image 70G is displayed on the left side of the shift display region 70D.

Figure 10:
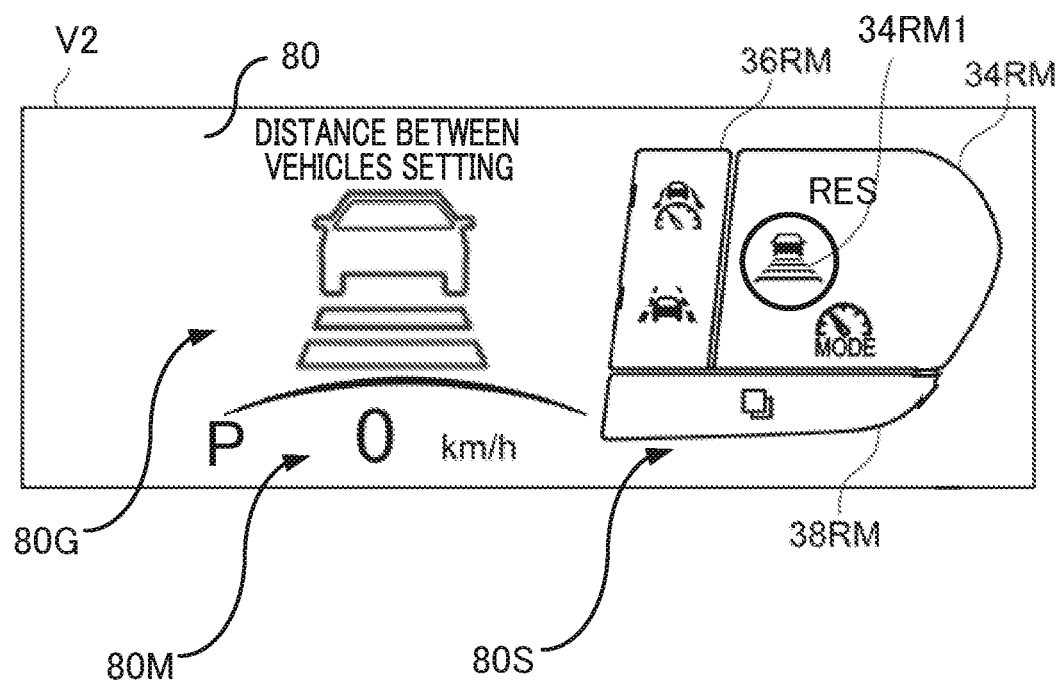
FIG. 10 is a drawing showing an example of an operation screen on a head-up display.

Furthermore, when the steering switches 30 are operated, as shown in FIG. 10, the display control unit 56 displays an image 80 in the display region V2. FIG. 10 shows, as an example, a state in which the occupant is touching the right first operation switch 34R shown in FIG. 1, that is, a state in which a function is being set. In the image 80, a vehicle speed image 80M showing the current vehicle speed of the vehicle 12 is displayed in the lower left portion. Displayed in the vehicle speed image 80M are, as an example, the vehicle speed, a substantially arc-shaped indicator disposed above the vehicle speed, and the shift range disposed on the left side of the vehicle speed.

Furthermore, a right operation image 80S is displayed on the right side of the image 80. The right operation image 80S is configured to include a right first operation switch image 34RM with a shape in imitation of the right first operation switch 34R, a right second operation switch image 36RM with a shape in imitation of the right second operation switch 36R, and a right function switching switch image 38RM with a shape in imitation of the right function switching switch 38R.

Here, as an example, icons are not displayed in the right portion of the right first operation switch image 34RM. In this way, in a case where there are no allocated functions, icons are not displayed.

In the left portion of the right first operation switch image 34RM is displayed a headway setting icon 34RM1 relating to setting the headway, and when this headway setting icon 34RM1 is selected, the headway can be set. That is, a function for setting the headway is allocated to the left portion of the right first operation switch 34R.

When the occupant touches the left portion of the right first operation switch 34R, the headway setting icon 34RM1 is displayed more conspicuously than other icons as the function that is currently being set, and a headway setting image 80G relating to setting the headway is displayed on the upper side of the vehicle speed image 80M in the image 80. In this state, when the occupant presses the left portion of the right first operation switch 34R, the function for setting the headway is executed.

Figure 11:
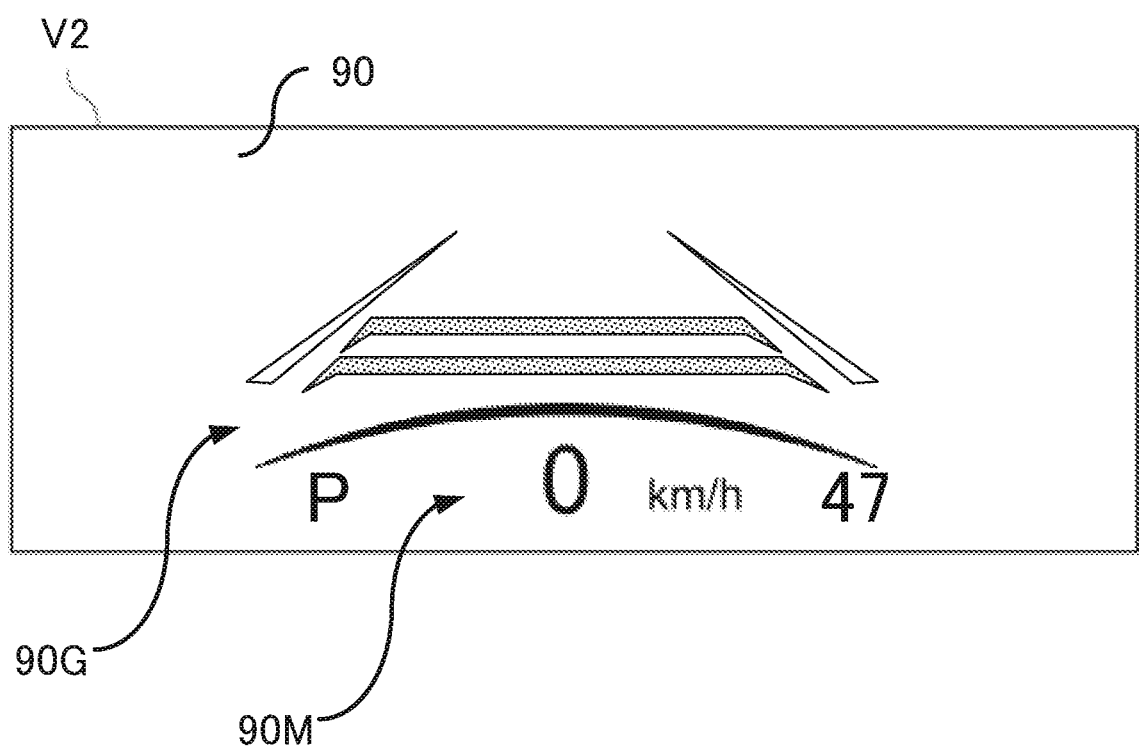
FIG. 11 is a drawing showing an example of a status display screen on the head-up display.

When the function for setting the headway is executed, as shown in FIG. 11, the display control unit 56 displays an image 90 in the display region V2. In the image 90, a vehicle speed image 90M that is an enlarged image of the vehicle speed image 80M is displayed in the central lower side. Furthermore, on the upper side of the vehicle speed image 90M is displayed a headway setting image 90G indicating that the function for setting the headway is currently being executed. It will be noted that in order to show that the function for setting the headway is being executed, the display control unit 56 displays the headway setting image 90G in a more conspicuous color than the headway setting image 80G.

(Display Process)

Next, a vehicle display control process executed in the display control ECU 28 will be described using the flowchart shown in FIG. 12. The display control process is executed as a result of the CPU 40A reading a display control program from the ROM 40B or the storage 40D, transferring it to the RAM 40C, and executing it. It will be noted that the following process is started after an instruction to switch on the display screen is issued by the display control ECU 28.

Figure 12:
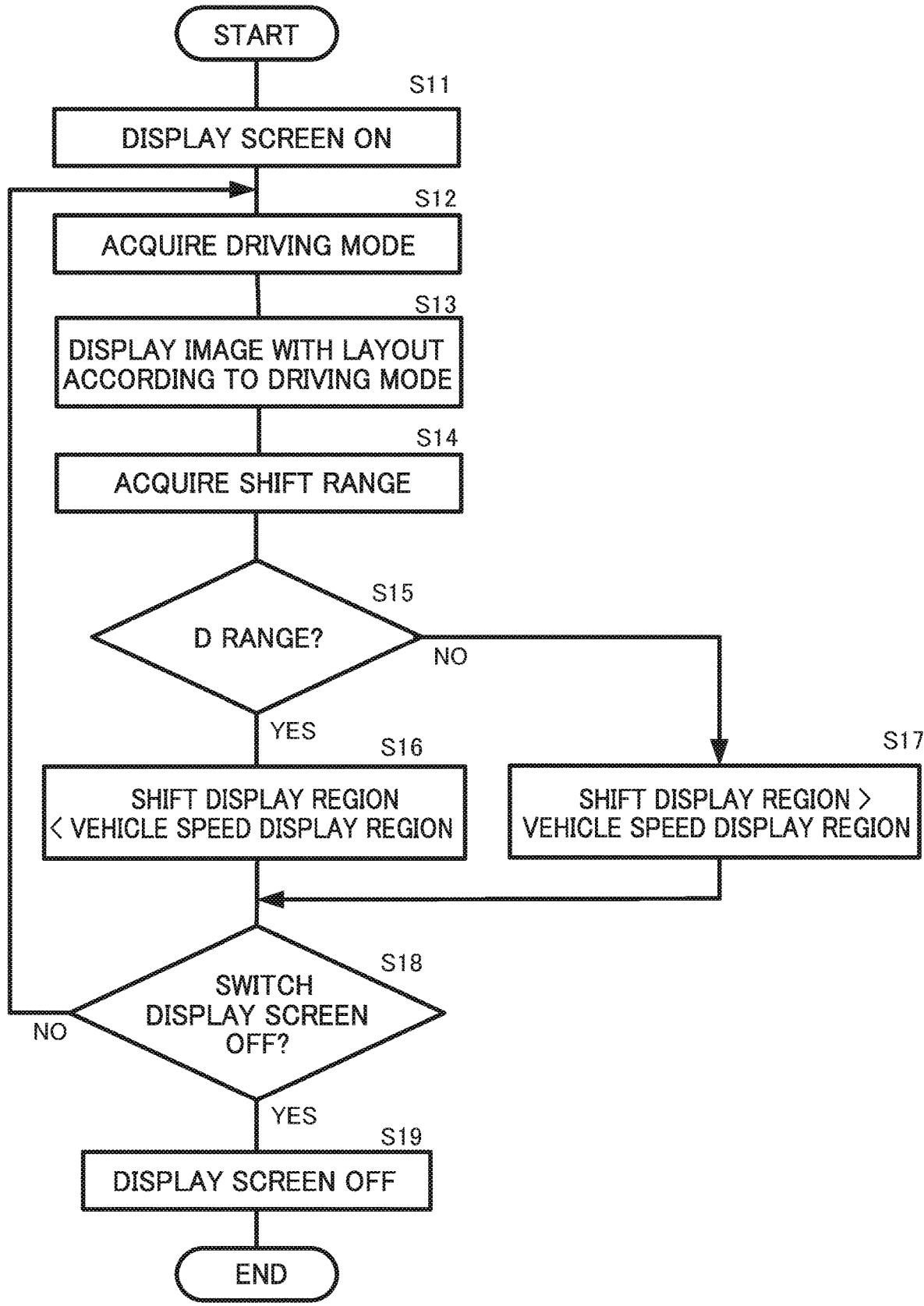
FIG. 12 is a flowchart showing an example of the flow of a display process in the embodiment.

As shown in FIG. 12, in step S11 the display control ECU 28 switches on the display screen (display region V1) of the first display unit 24 and the head-up display device 44 (display region V2).

Next, in step S12 the driving mode acquisition unit 52 acquires the current driving mode. Then, in step S13 the display control unit 56 displays, in the way described above in the display region V1, an image with a layout according to the driving mode acquired by the driving mode acquisition unit 52.

Next, in step S14 the shift range acquisition unit 54 acquires the current shift range. Then, in step S15 the display control unit 56 judges whether or not the shift range acquired by the shift range acquisition unit 54 is the D range. In a case where the shift range is the D range (YES in step S15), in step S16 the display control unit 56 displays the vehicle speed display region 60E, 70E larger than the shift display region 60D, 70D. In a case where the shift range is not the D range in step S15, that is, in a case where the shift range is the P range, the N range, or the R range (NO in step S15), in step S17 the display control unit 56 displays the shift display region 60D, 70D larger than the vehicle speed display region 60E, 70E.

Next, in step S18 the CPU 40A judges whether or not there is an instruction to switch off the display screen. In a case where there is not an instruction to switch off the display screen (NO in step S18), the CPU 40A moves to the process of step S12 and repeatedly executes processes from step S12 on. In a case where there is an instruction to switch off the display screen in step S18 (YES in step S18), in step S19 the display control ECU 28 switches off the display screen (display region V1) of the first display unit 24 and the head-up display device 44 (display region V2) and ends the series of processes.

In this way, until the display screen is switched off, the display control ECU 28 changes the layout of the display screen displayed in the display region V1 in accordance with the driving mode, changes the display proportions of the shift display region 60D, 70D and the vehicle speed display region 60E, 70E in accordance with the type of shift range, and displays the shift display region 60D, 70D and the vehicle speed display region 60E, 70E in the display region V1.

(Action and Effects)

Next, the action and effects of this embodiment will be described.

The display control ECU 28 serving as the vehicle display control device pertaining to this embodiment changes, in accordance with the type of shift range that has been selected, the display proportions of the shift display region 60D, 70D for displaying the shift range of the vehicle 12 and the vehicle speed display region 60E, 70E for displaying the vehicle speed of the vehicle and displays the shift display region 60D, 70D and the vehicle speed display region 60E, 70E. For that reason, information that is more necessary can be displayed larger, so the user can visually comprehend information that is necessary in driving situations without the user being conscious of it.

Furthermore, in the display control ECU 28 serving as the vehicle display control device pertaining to this embodiment, in a case where the shift range is the P range, the N range, or the R range, the display control unit 56 makes the shift display region 60D, 70D for displaying the P range, the N range, or the R range larger than the vehicle speed display region 60E, 70E. For that reason, in a case where the shift range is the P range, the N range, or the R range, the shift range is displayed larger than the vehicle speed, which allows the user to more easily visually comprehend the shift range than the vehicle speed. Because of this, misapplication of the accelerator pedal or the brake pedal by the user can be inhibited.

Furthermore, in the display control ECU 28 serving as the vehicle display control device pertaining to this embodiment, in a case where the shift range is the D range, the display control unit 56 makes the vehicle speed display region 60E, 70E larger than the shift display region 60D, 70D. This allows the user to more easily comprehend the vehicle speed than the shift range while driving the vehicle 12. Because of this, the user can be inhibited from driving too fast.

Furthermore, in the display control ECU 28 serving as a vehicle display control device pertaining to this embodiment, the display control unit 56 displays with an animated display that inverts the images displayed in the shift display region 60D, 70D and the vehicle speed display region 60E, 70E. Because of this, the user more easily visually comprehends the fact that the display has switched, that is, that the shift range and/or the vehicle speed have changed.

Furthermore, in the display control ECU 28 serving as the vehicle display control device pertaining to this embodiment, the display control unit 56 changes the layout including the display proportions in accordance with the driving mode, so an optimum layout according to the driving mode becomes displayed, and the inconvenience of the user having to manage display settings, such as switching what is displayed on the meter display for each driving mode, can be eliminated.

Furthermore, the vehicle display device 10 pertaining to this embodiment includes the first display unit 24, on which the shift display region 60D, 70D and the vehicle speed display region 60E, 70E are displayed, and the display control ECU 28, so the same action and effects as those of the display control ECU 28 are obtained.

Furthermore, the vehicle 12 pertaining to this embodiment includes the vehicle display device 10, so like the vehicle display device 10, the same action and effects as those of the display control ECU 28 are obtained.

Furthermore, also with the vehicle display control method and the vehicle display control program pertaining to this embodiment, the same action and effects as those of the display control ECU 28 are obtained.

In the embodiment described above, as shown in FIG. 4, a hybrid electric vehicle (HEV) or a plug-in hybrid electric vehicle (PHEV) that is the vehicle 12 in which an energy monitor for providing information about tire, battery, and energy relations is displayed in the display region 60F is taken as an example. However, the vehicle 12 may also be a fuel cell electric vehicle (FCEV) or a battery electric vehicle (BEV). Furthermore, the vehicle 12 may also be a vehicle equipped with an engine (a reciprocating engine) as a drive source for driving. In the case of a vehicle equipped with an engine, a display screen on which Eco drive information is displayed, for example, can be displayed instead of the display screen on which the energy monitor is displayed. It will be noted that the display control ECU 28 may also carry out displays according to the vehicle in which it is installed.

Furthermore, in the above embodiment, FIG. 4 to FIG. 11 were described as examples of display screens displayed by the display control unit 56, but the disclosure is not limited to this, and the display screens can be changed to different layouts as needed.

Furthermore, the numbers and shapes of the operation switches and the function switching switches are not particularly limited and may be appropriately changed.

Furthermore, the processes that the CPU 40A shown in FIG. 2 executed by reading software (a program) in this embodiment may also be executed by various types of processors other than a CPU. Examples of processors in this case include programmable logic devices (PLDs) whose circuit configuration can be changed after manufacture, such as field-programmable gate arrays (FPGAs), and dedicated electrical circuits that are processors having a circuit configuration dedicatedly designed for executing specific processes, such as application-specific integrated circuits (ASICs). Furthermore, the processes may be executed by one of these various types of processors or may be executed by a combination of two or more processors of the same type or different types (e.g., plural FPGAs, and a combination of a CPU and an FPGA, etc.). Furthermore, the hardware structures of these various types of processors are more specifically electrical circuits in which circuit elements such as semiconductor elements are combined.

Furthermore, the programs described in this embodiment may also be provided in a form in which they are recorded in a non-transitory computer-readable recording medium such as a compact disc read-only memory (CD-ROM), a digital versatile disc read-only memory (DVD-ROM), and a universal serial bus (USB) memory. Furthermore, the programs may also take a form in which they are downloaded via a network from an external device.

An embodiment of the disclosure has been described above, but the disclosure is not limited to what is described above and can also, in addition to what is described above, be modified and implemented in various ways in a range that does not depart from the spirit thereof.

It is an object of the present disclosure to obtain a vehicle display control device with which a user can visually comprehend information that is necessary in driving situations without the user being conscious of it, a vehicle display device, a vehicle, a vehicle display control method, and a non-transitory computer-readable recording medium in which a vehicle display control program is recorded.

A first aspect of the present disclosure is a vehicle display control device, that includes: a memory; and a processor coupled to the memory, the processor being configured to: change, in accordance with a type of shift range that has been selected, display proportions of a first display region for displaying a shift range of a vehicle and a second display region for displaying a vehicle speed of the vehicle; and display the first display region and the second display region on a display.

In the vehicle display control device of the first aspect, the processor changes, in accordance with the type of shift range that has been selected, the display proportions of the first display region for displaying the shift range of the vehicle and the second display region for displaying the vehicle speed of the vehicle and displays the first display region and the second display region on the display. For that reason, information that is more necessary can be displayed larger, so the user can visually comprehend information that is necessary in driving situations without the user being conscious of it.

A second aspect of the present disclosure is the vehicle display control device of the first aspect, wherein, in response to the shift range being a parking position, a neutral position, or a reverse position, the processor is configured to make the first display region for displaying the parking position, the neutral position, or the reverse position, larger than the second display region.

In the vehicle display control device of the second aspect, in a case where the shift range is the parking position, the neutral position, or the reverse position, the processor makes the first display region for displaying the parking position, the neutral position, or the reverse position larger than the second display region. For that reason, in a case where the shift range is the parking position, the neutral position, or the reverse position, the shift range is displayed larger on the display than the vehicle speed, which allows the user to more easily visually comprehend the shift range than the vehicle speed. Because of this, misapplication of the accelerator pedal or the brake pedal by the user can be inhibited.

A third aspect of the present disclosure is the vehicle display control device of the first or second aspect, wherein, in response to the shift range being a drive position, the processor is configured to make the second display region larger than the first display region for displaying the drive position.

In the vehicle display control device of the third aspect, in a case where the shift range is the drive position, the processor makes the second display region for displaying the vehicle speed of the vehicle larger than the first display region for displaying the drive position. This allows the user to more easily comprehend the vehicle speed than the shift range while driving the vehicle. Because of this, the user can be inhibited from driving too fast.

A fourth aspect of the present disclosure is the vehicle display control device of any of the first to third aspects, wherein the processor is configured to: acquire a driving mode of the vehicle; and change the display proportions in accordance with the driving mode that has been acquired.

In the vehicle display control device pertaining to the disclosure of the fourth aspect, the processor changes the layout including the display proportions in accordance with the driving mode, so an optimum layout according to the driving mode becomes displayed, and the inconvenience of the user having to manage display settings, such as switching what is displayed on the meter display for each driving mode, can be eliminated.

A fifth aspect of the present disclosure is a vehicle display device that includes: a display that displays a first display region and a second display region; and the vehicle display control device of any one of the first to fourth aspects.

The vehicle display device of the fifth aspect includes the display that displays the first display region and the second display region and the vehicle display control device of any of the first aspect to the fourth aspect. The vehicle display control device is the vehicle display control device of any of the first aspect to the fourth aspect, so the action and effects described above are obtained.

A sixth aspect of the present disclosure is a vehicle that includes the vehicle display device of the fifth aspect.

The vehicle of the sixth aspect includes the vehicle display device of the fifth aspect. The vehicle display device is the vehicle display device of the fifth aspect, and the vehicle display control device is the vehicle display control device of any of the first aspect to the fourth aspect, so the action and effects described above are obtained.

A seventh aspect of the present disclosure is a vehicle display control method that includes: by a processor: changing, in accordance with a type of shift range that has been selected, display proportions of a first display region for displaying a shift range of a vehicle and a second display region for displaying a vehicle speed of the vehicle; and displaying the first display region and the second display region on a display.

In the vehicle display control method of the seventh aspect, the processor changes, in accordance with the type of shift range that has been selected, the display proportions of the first display region for displaying the shift range of the vehicle and the second display region for displaying the vehicle speed of the vehicle and displays the first display region and the second display region on the display. For that reason, information that is more necessary can be displayed larger, so the user can visually comprehend information that is necessary in driving situations without the user being conscious of it.

An eighth aspect of the present disclosure is a non-transitory computer-readable recording medium storing a vehicle display control program executable by a computer to perform processing, the processing including: changing, in accordance with a type of shift range that has been selected, display proportions of a first display region for displaying a shift range of a vehicle and a second display region for displaying a vehicle speed of the vehicle; and displaying the first display region and the second display region on a display.

The non-transitory computer-readable recording medium in which is recorded the vehicle display control program of the eighth aspect causes a computer to execute a process to change, in accordance with the type of shift range that has been selected, the display proportions of the first display region for displaying the shift range of the vehicle and the second display region for displaying the vehicle speed of the vehicle and display the first display region and the second display region on the display. For that reason, information that is more necessary can be displayed larger, so the user can visually comprehend information that is necessary in driving situations without the user being conscious of it.

As described above, according to the vehicle display control device, the vehicle display device, the vehicle, the vehicle display control method, and the non-transitory computer-readable recording medium in which is recorded a vehicle display control program pertaining to the present disclosure, the user can visually comprehend information that is necessary in driving situations without the user being conscious of it.

What is claimed is:

1. A vehicle display control device, comprising:
   a memory; and
   a processor coupled to the memory, the processor being configured to:
   change, in accordance with a type of shift range that has been selected, display proportions of a first display region for displaying a shift range of a vehicle and a second display region for displaying a vehicle speed of the vehicle; and
   display the first display region and the second display region on a display,
   wherein, in response to the shift range being a parking position, a neutral position, or a reverse position, the processor is configured to make the first display region for displaying the parking position, the neutral position, or the reverse position, larger than the second display region.

2. The vehicle display control device of claim 1, wherein, in response to the shift range being a drive position, the processor is configured to make the second display region larger than the first display region for displaying the drive position.

3. The vehicle display control device of claim 1, wherein the processor is configured to:
   acquire a driving mode of the vehicle; and
   change the display proportions in accordance with the driving mode that has been acquired.

4. A vehicle display device, comprising:
   a display that displays a first display region and a second display region; and
   the vehicle display control device of claim 1.

5. A vehicle, comprising the vehicle display device of claim 2.

6. The vehicle display control device of claim 1, further comprising:
   acquiring a driving mode of the vehicle; and
   changing the display proportions in accordance with the driving mode that has been acquired.

7. A vehicle display control method, comprising:
   by a processor:
   changing, in accordance with a type of shift range that has been selected, display proportions of a first display region for displaying a shift range of a vehicle and a second display region for displaying a vehicle speed of the vehicle;
   displaying the first display region and the second display region on a display; and
   in response to the shift range being a parking position, a neutral position, or a reverse position, making the first display region for displaying the parking position, the neutral position, or the reverse position, larger than the second display region.

8. The vehicle display control method of claim 7, further comprising, in response to the shift range being a drive position, making the second display region larger than the first display region for displaying the drive position.

9. A non-transitory computer-readable recording medium storing a vehicle display control program executable by a computer to perform processing, the processing comprising:
   changing, in accordance with a type of shift range that has been selected, display proportions of a first display region for displaying a shift range of a vehicle and a second display region for displaying a vehicle speed of the vehicle;
   displaying the first display region and the second display region on a display; and
   in response to the shift range being a parking position, a neutral position, or a reverse position, making the first display region for displaying the parking position, the neutral position, or the reverse position, larger than the second display region.

10. The non-transitory computer-readable recording medium of claim 9, wherein the processing further comprises, in response to the shift range being a drive position, making the second display region larger than the first display region for displaying the drive position.

11. The non-transitory computer-readable recording medium of claim 9, wherein the processing further comprises:
    acquiring a driving mode of the vehicle; and
    changing the display proportions in accordance with the driving mode that has been acquired.

* * * * *